US006604129B2

(12) United States Patent
Slutsman et al.

(10) Patent No.: US 6,604,129 B2
(45) Date of Patent: *Aug. 5, 2003

(54) METHOD AND APPARATUS FOR A CONFERENCE CALL MEDIATION SERVICE

(75) Inventors: Lev Slutsman, Asbury Park, NJ (US); Frederick M. Burg, West Long Branch, NJ (US); Kathleen S. Meier-Hellstern, Cranbury, NJ (US)

(73) Assignee: AT&T Corp., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,523

(22) Filed: Mar. 25, 1999

(65) Prior Publication Data

US 2002/0138569 A1 Sep. 26, 2002

(51) Int. Cl.[7] .............................................. G06F 13/00
(52) U.S. Cl. ....................... 709/204; 709/228; 709/221; 345/753
(58) Field of Search ................................ 709/204, 220, 709/221, 222, 228, 205; 345/751–759

(56) References Cited

U.S. PATENT DOCUMENTS

| 5,317,683 A | * | 5/1994 | Hager et al. .................. 345/751 |
| 5,491,797 A | | 2/1996 | Thompson et al. |
| 5,541,639 A | | 7/1996 | Takatsuki et al. |
| 5,642,156 A | | 6/1997 | Saiki |
| 5,659,692 A | | 8/1997 | Poggio et al. ................ 345/756 |
| 5,778,187 A | | 7/1998 | Monteiro et al. ............ 709/231 |
| 5,835,127 A | | 11/1998 | Booth et al. ..................... 725/76 |
| 5,838,775 A | | 11/1998 | Montalbano ............. 379/93.23 |
| 5,845,074 A | | 12/1998 | Kobata ......................... 709/219 |
| 5,848,397 A | | 12/1998 | Marsh et al. .................... 705/14 |
| 5,852,656 A | * | 12/1998 | Sato et al. ................ 379/93.21 |
| 5,859,979 A | * | 1/1999 | Tung et al. .................. 709/228 |
| 5,864,823 A | | 1/1999 | Levitan .......................... 705/14 |
| 5,864,868 A | | 1/1999 | Contois ..................... 707/104.1 |
| 5,867,494 A | | 2/1999 | Krishnaswamy et al. ... 370/352 |
| 5,867,654 A | | 2/1999 | Ludwig et al. ............. 709/204 |
| 5,870,412 A | | 2/1999 | Schuster et al. ............. 714/752 |
| 5,872,565 A | | 2/1999 | Greaves et al. .............. 345/723 |
| 5,907,324 A | * | 5/1999 | Larson et al. ................ 345/753 |
| 5,949,975 A | * | 9/1999 | Batty et al. .................. 709/213 |
| 6,006,253 A | * | 12/1999 | Kumar et al. ............... 709/204 |
| 6,119,147 A | * | 9/2000 | Toomey et al. ............. 709/204 |
| 6,195,091 B1 | * | 2/2001 | Harple et al. ................ 345/751 |
| 6,202,084 B1 | * | 3/2001 | Kumar et al. ............... 709/204 |
| 6,223,212 B1 | * | 4/2001 | Batty et al. .................. 709/204 |

FOREIGN PATENT DOCUMENTS

| EP | 0 574 138 A1 | 12/1993 |
| EP | 0 817 451 A2 | 1/1998 |
| JP | 10-243108 | 9/1998 |

OTHER PUBLICATIONS

European Search Report, Jun. 5, 2002.

* cited by examiner

Primary Examiner—Kenneth R. Coulter

(57) ABSTRACT

A method and apparatus for a conference call mediation service which allows for the scheduling of multi-participant conferences over the Internet is presented. A subscriber who desires to host a conference sends a conference request to a Web Service Control Point (WSCP) with attributes regarding the conference (i.e., date, time, conference agenda, etc.). The WSCP generates a unique conference ID, identifying the attributes of the proposed conference, and broadcasts a conference invitation to potential conference participants. Potential participants respond to the conference invitation and may make changes to, or modify, the attributes of the proposed conference. The WSCP acts as a negotiator between potential conference participants by continuing to resend the modified and unmodified conference attributes until an agreement regarding the conference is reached. At that point the WSCP schedules the conference with a communication service provider and sends a confirmation to each participant.

10 Claims, 3 Drawing Sheets

METHOD AND APPARATUS FOR A CONFERENCE CALL MEDIATION SERVICE

BACKGROUND OF THE INVENTION

1. Field of the Invention

The present invention relates to a method and apparatus for a conference call mediation service, and more particularly, to a conference call mediation service which allows for the scheduling of multi-participant conferences of subscribers over the Internet.

2. Description of the Art

The use of the Internet for conferencing is growing as more individuals make more extensive use of their personal computers both at home and at work. These Internet conferencing uses include video-conferencing, viewing of graphical and textual materials, taking notes, real-time Emails, etc. As this type of use of the Internet grows, several patents related to this area have issued. For example, U.S. Pat. No. 5,659,692, issued on Aug. 19, 1997 to Poggio, et al., relates to a Computer Method and Apparatus for Video Conferencing in which graphics and video data can be transmitted between a multiplicity of workstations coupled to one another across the Internet. Interactive video conferencing results as the workstations communicate the images in real-time to each other.

However, before any such conferencing is possible, the participants must resolve differences in scheduling times, conference agendas, materials, etc. Thus, there is a need before the conference for a negotiation phase which can also be accomplished over the Internet. Until now the negotiation phase of conferencing has drawn little attention. In fact, the known multi-party oriented conference protocols, such as H.323, SAP and SIP, have largely ignored pre-conference negotiation and have instead focused on, at most, the five phases of the multi-media conference itself. That is: 1) User Location (i.e., resolving participants' addresses and determining the end systems to be used); 2) User Capabilities (i.e., determining the media parameters for the RTP protocol); 3) User Disposition (i.e., determining each participant's willingness to join the conference); 4) Call Setup (i.e., ringing, alerting, and establishing call parameters between participants); and 5) Call Handling (i.e., including data transfer, run-time changes of capabilities and call termination). Thus it is clear that the pre-conference negotiation phase is outside the scope and capability of these protocols.

SUMMARY OF THE INVENTION

Accordingly, the present invention proposes a method and apparatus for a conference call mediation service which allows for the scheduling of multi-participant conferences of subscribers over the Internet. A special Internet server, a Web Service Control Point (WSCP), acts as the conference call mediation service by conducting one or more rounds of pre-conference scheduling negotiations.

The WSCP, upon receipt of a conference request from a prospective conference host, generates a unique conference ID which identifies information pertaining to the requested conference. After generating the unique conference ID, and ensuring that the conference request is complete, the WSCP sends an acknowledgment to the conference host and contacts potential conference participants. Potential participants are given the opportunity to make changes to the proposed conference as the WSCP conducts a number of rounds of negotiation. If an agreement as to the conference is reached, the WSCP coordinates the scheduling of the conference over the chosen means of communication.

The present invention, including its features and advantages, will become more apparent from the following detailed description with reference to the accompanying drawings.

DETAILED DESCRIPTION

Figure 1:
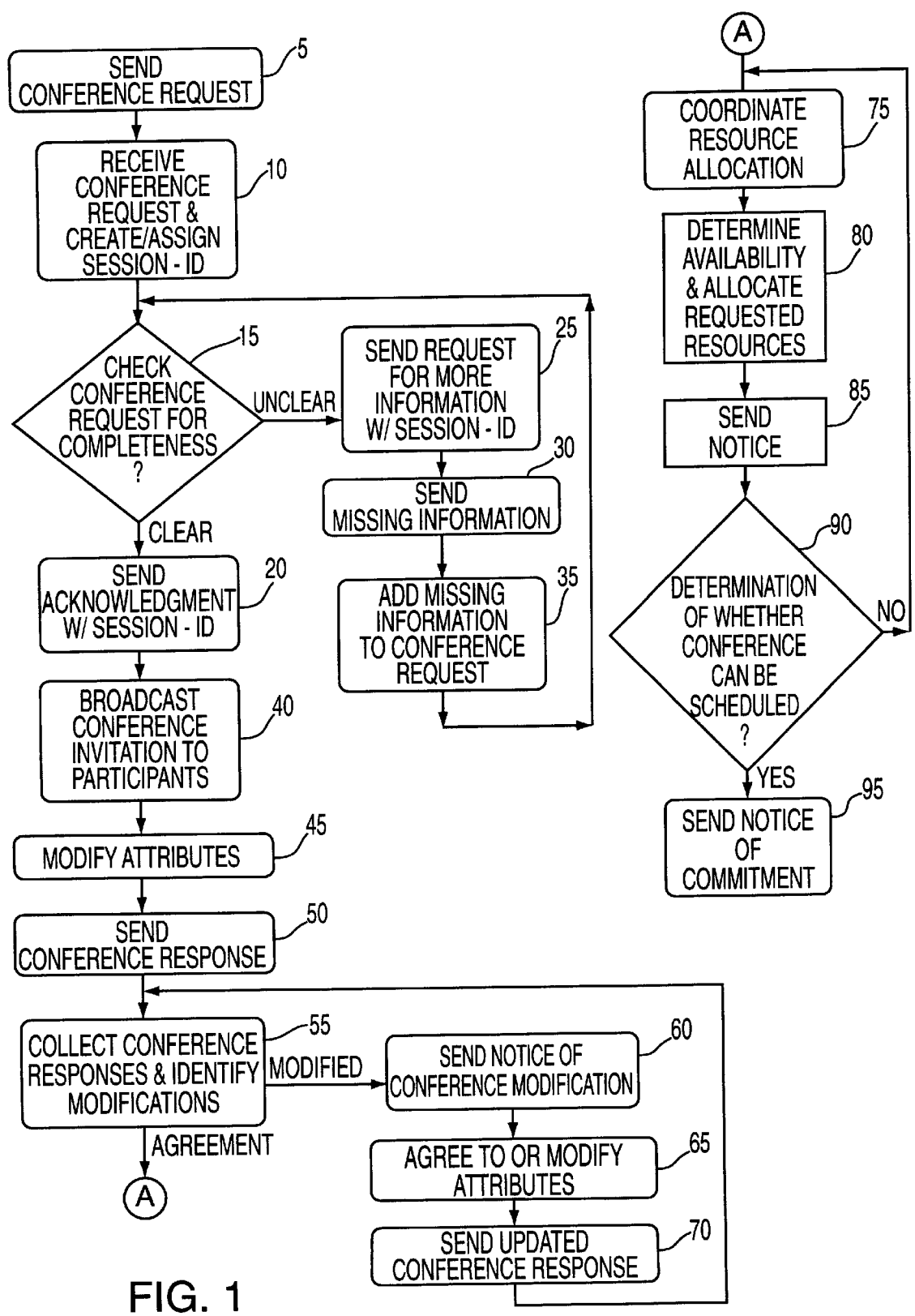
FIG. 1 illustrates a flow chart for a pre-conference negotiation, according to an embodiment of the present invention.
Figure 2:
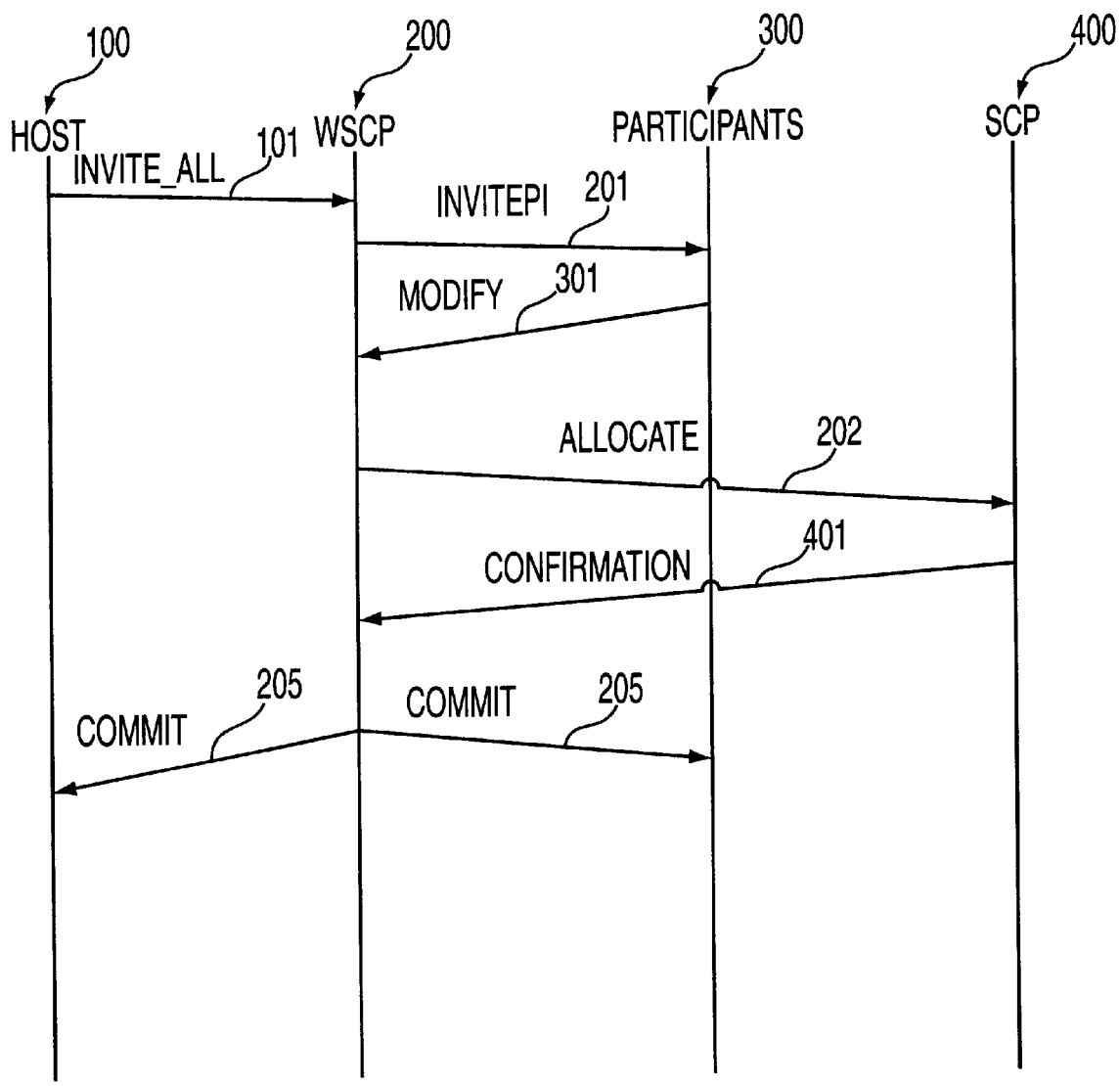
FIG. 2 illustrates a message chart for a pre-conference negotiation, according to an embodiment of the present invention.
Figure 3:
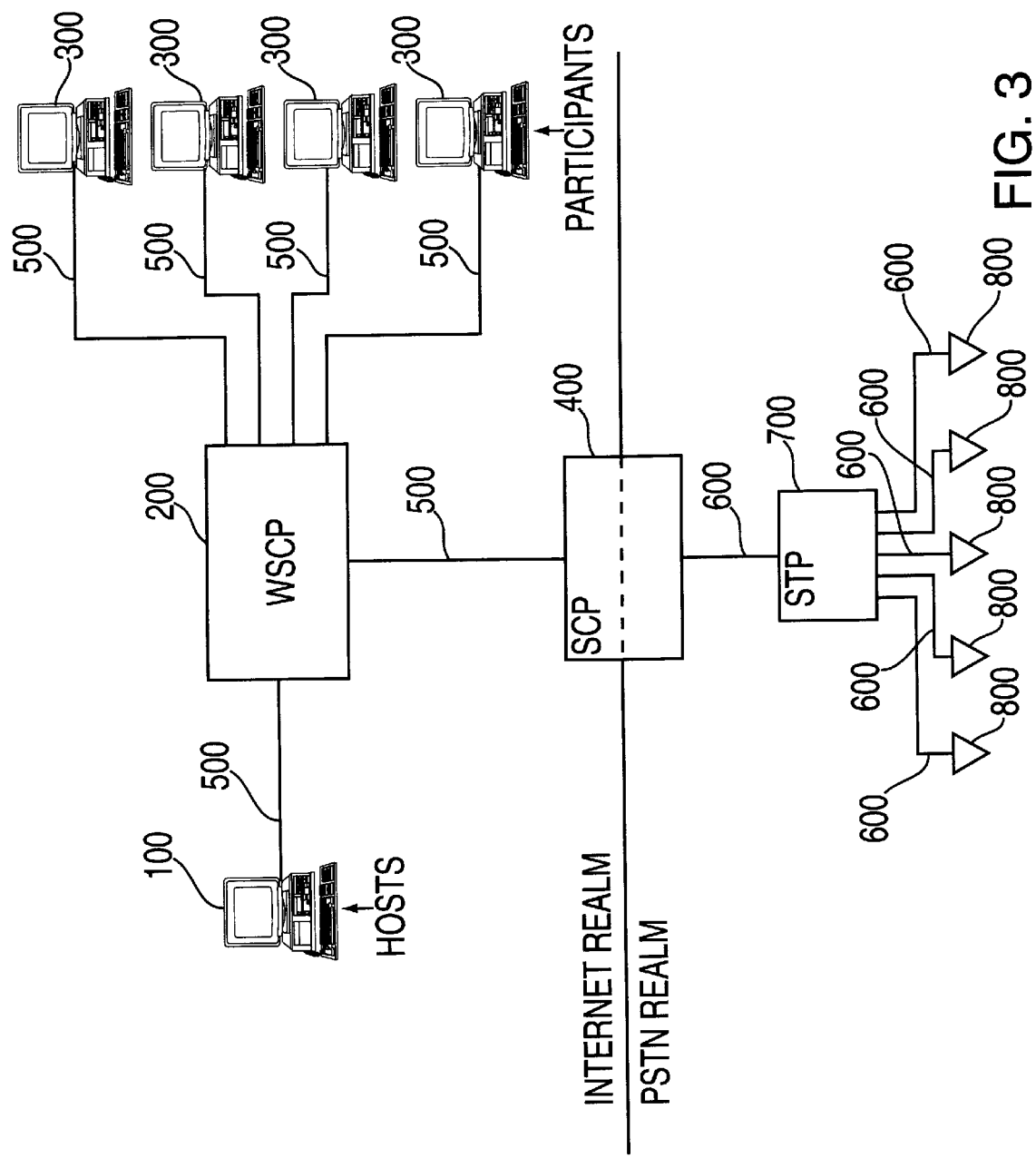
FIG. 3 illustrates an apparatus for the conference call mediation service, according to an embodiment of the present invention.

FIGS. 1 through 3 illustrate a method and apparatus for the scheduling of multi-participant conferences through a series of negotiation rounds conducted over the Internet by the conference call mediation service.

Referring to FIG. 1, in step 5, a conference host, who wishes to host a multi-participant conference, contacts a special Internet server, the WSCP, over the Internet by sending a conference request. The conference request will naturally contain relevant information, in the form of attributes, about the requested conference. Such attributes may be: a potential conference participant list; dates of availability for the conference; conference agenda items; relevant documents for the conference; conference communication means; maximum number of negotiation rounds; etc. The attributes are formatted as the use and need may be for the particular attribute. For instance, attributes relating to potential participants may be formatted in the mailto/telnet form: "User@host[:telephone_number]"; etc. Also, attributes relating to relevant documents may be formatted in the form: "URL/document.html"; etc. It is to be understood, of course, that the conference host may contact the WSCP by any means of communication at his or her disposal and which is capable of transferring the conference request and its list of attributes to the WSCP. Such initial contact is accordingly not to be limited solely to the Internet.

In step 10 then, the WSCP receives the conference request from the conference host and assigns a unique conference negotiation session-ID to the requested conference. The session-ID is used accordingly between the WSCP, the host and all potential conference participants in all future pre-conference negotiation communications to identify the conference (and the accompanying conference attributes) to which the communication applies. In step 15, the WSCP performs a check of the conference request to ensure that it contains at least a minimal amount of information necessary to make the conference request understandable. If the conference request does contain the minimal amount of information, in step 20 the WSCP will send an acknowledgment of receipt back to the host with the identifying session-ID. If the conference request is missing information and is thus unclear, in step 25 the WSCP will send a request for further information back to the host. For instance, the conference host may have neglected to include in the conference request his or her availability date(s) for the conference. In this case, the WSCP will send a request to the host to send the missing information of his or her availability date(s), and will identify the previously sent conference request by the assigned session-ID. In step 30, the conference host must then send the missing information, with the appropriate identifying session-ID, to the WSCP. Upon receipt of the missing information, in step 35 the WSCP will add that information to the identified conference request previously received in step 10 and, returning to step 15, will again check the conference request. The process of checking the conference request and requesting further information can be repeated as many times as is necessary to ensure that a complete and understandable conference request is received. Further, if the WSCP does not receive a response to the request for further information, it can resend the request after a pre-determined time has elapsed.

After sending an acknowledgment of having received a complete conference request, in step 40 the WSCP contacts each potential participant by broadcasting an invitation to the conference. The conference invitation contains the session-ID identifying the conference and those attributes sent in the conference request which are necessary for the participants to make a determination as to whether or not they will be able to "attend" the conference. Upon receipt of the conference invitation, in step 45, the potential participants can review those attributes and modify them as they see fit. For example, a potential participant may want to change the date of the conference, add or remove a particular topic to the conference agenda, or even point out an additional document reference for the conference. Having modified the invitation or not, in step 50 each potential participant sends a conference response, containing the session-ID and modified and/or unmodified conference attributes, to the WSCP. If a potential participant does not send a conference response to the WSCP before a pre-determined amount of time, the WSCP can send to that participant a reminder to respond to the previously sent conference invitation. Alternatively, or failing to receive a response after the reminder to respond has been sent, the WSCP may resend the conference invitation again in its entirety to that non-responsive potential participant. If, after a predetermined number of tries to elicit a response to the conference invitation, there has still been no response, the WSCP will send a notice of no response to the host regarding that particular non-responsive potential participant and will continue with the pre-conference negotiation as outlined below. In any event, the non-responsive potential participant can later be sent a courtesy notification regarding the agreed upon conference so that they might attend anyway.

After responses to the conference invitation have been sent, in step 55, the WSCP collects the responses and begins identifying those conference attributes which have been modified from the original conference request (and subsequent conference invitation). Identification of the differences can be carried out by the WSCP comparing and contrasting conference attributes of the original conference request to the conference attributes of each response, and/or vice versa, and/or by the WSCP comparing and contrasting conference attributes between each of the conference responses. Thus, it is to be understood, of course, that such identification may be carried out in a variety of ways. The session-ID, as stated above, is used to identify to which conference the responses (and attributes) apply.

If in step 55 the WSCP determines that one or more of the conference attributes has not been agreed upon (i.e., must have necessarily been modified), in step 60 the WSCP will send to the host and to each potential conference participant a notice of conference modification. The notice of conference modification will contain all of the conference attributes, whether modified or not, and, of course, the session-ID. This will allow each potential participant to re-review the entire attribute list of the proposed conference. Thus upon receipt of the notice, in step 65 each potential participant (including the host) reviews the modified and unmodified conference attributes and, after agreeing to the conference attributes or modifying them still further, in step 70 sends an updated response to the WSCP. It is to be understood, of course, that the potential participant may in step 65 modify a conference attribute which until that time had not yet been modified. The WSCP collects the updated responses sent in step 70 and continues as before in step 55. Thus, the pre-conference scheduling negotiation of steps 55, 60, 65 and 70 continue as a series of rounds until agreement is reached regarding the attributes of the proposed conference. If, after a pre-determined number of negotiation rounds agreement as to the conference attributes has still not been reached, the WSCP can cut off further negotiation and notify the host that agreement has not been reached. In this manner the host may submit a new conference request, with new attributes, in the hope that an agreement can now be reached. Alternatively, the WSCP can be instructed to let the majority rule, so to speak, after a pre-determined number of negotiation rounds and to notify the host of any outstanding differences. For instance, if only one potential participant (or a minority of potential participants) out of an entire list of participants cannot make a specified date, then the WSCP can end the pre-conference negotiation phase, as outlined below, and notify the host of those potential participants who cannot make the date.

Once, in step 55, the WSCP determines that all conference attributes have been agreed upon by the potential conference participants (or that a pre-determined number of negotiation rounds has been reached and the majority decision will rule), in step 75 the WSCP will coordinate allocation of the communication resources necessary for the conference. For such coordination, the WSCP will contact an appropriate service provider that can provide the communication resources specified by the agreed upon communication means conference attribute. For example, if the communication means specified by the agreed upon conference attribute is telephonic, then the WSCP would contact a telephone service provider (such as AT&T) in order to request allocation of PSTN resources for a telephone conference call. The resource allocation request sent by the WSCP will necessarily, of course, include all of the relevant information about the conference such that the service provider can make a determination of what resources need to be allocated and when. It should be noted that the communication service provider may also be contacted by the WSCP before the pre-conference negotiation rounds occur (i.e., before the conference invitation is broadcast to the potential participants) in order that the WSCP can ensure that the service provider (or alternate service provider as the case may be) is in fact capable of providing the communication means the host specified in the appropriate conference attribute.

Thus upon receipt of such resource allocation request, including, of course, notification of the date, time, participants, etc., in step 80 the communication service provider will determine if such resources are available and allocate them as requested. In step 85 the service provider will send a notice of confirmation of the resource allocation to the WSCP. If, of course, the resources are unavailable, the service provider will send an appropriate notice of unavailability to the WSCP.

Based upon the notice sent by the service provider in step 85, in step 90 the WSCP makes a determination of whether the conference can be scheduled. In the instance where the service provider is unable to provide the resources, the WSCP can contact another service provider by returning to step 75. The WSCP can repeat the resource allocation steps 75, 80, 85 and 90 as many times as necessary until the Internet server finds a service provider capable of allocating the resources and handling the conference. Alternatively, in the instance where the service provider is able to provide resources capable of supporting the conference, the WSCP will send a notice of commitment to the host and each of the potential conference participants in step 95. At this point the negotiation service of the WSCP is finished as the conference has been scheduled and all participants have been notified.

Referring to FIG. 2, a message chart shows a possible pre-conference negotiation phase in which messages are sent over the Internet between a Host 100, a WSCP 200, a number of potential participants 300 and a Service Control Point (SCP) 400 of a communication service provider. Since all of the communications are conducted via the Internet, as shown in this embodiment of the present invention, each communication can use an http-like protocol. Accordingly, the Host 100, wishing to host a conference, sends a conference request 101 to the WSCP 200. As an example, the conference request 101 may be in the form: InviteAll [ParticipantAddress, NegotiationItems, Content]. Thus the conference request, as stated previously, contains the potential participant addresses, the attributes of the requested conference, and any negotiation instructions the host wishes to send to the WSCP. In this example then, the addresses are contained in the data field ParticipantAddresses, the conference attributes are contained in the data field NegotiationItems, and the instructions are contained in the data field Content.

While an acknowledgment message, sent by the WSCP to the host, can be the next step, it is to be understood that it is not shown in this Figure. Rather, in this example, the WSCP 200 then sends a conference invitation 201 to each of the potential conference participants 300. The conference invitation 201 may be in the form: InvitePart[ConfID, NegotiationItems, Content]. Here the session-ID, identifying the conference and its attributes, is contained in the data field ConfID. Having sent the conference invitation 201, the participants 300 send back a modified conference response 301. Here the conference response may be of the form: Modify [ConfID, NegotiationItems, Content]. The fact that the response has been modified can be indicated by the message header Modify.

While the WSCP 200 could identify response differences and then carry out a series of negotiation rounds to resolve those differences, this is not shown in this Figure. Assuming, however, that such negotiation rounds did occur and that an agreement has been reached, the WSCP 200 sends a resource allocation message 202 to the SCP 400 to request allocation of the required communication resources. The resource allocation message 202 can be of the form: Allocate [ConfID, ParticipantPhone#'s, Date & Time]. The data field ParticipantPhone#'s contains the conference participants phone numbers, assuming of course that the conference is to be telephonic.

Having received the allocation request, the SCP 400 sends back to the WSCP 200 a confirmation message 401. The confirmation message 401 may be of the form: Confirmation [ConfID], thus indicating confirmation of the allocation of the communication resources by the service provider. Upon receiving the confirmation message, the WSCP 200 sends a notice of commitment 205 to the Host 100 and each of the Participants 300. The notice of commitment 205 may be of the form: Commit[ConfID]. It is to be understood, of course, that both the form and nomenclature of any of the data fields mentioned above, and of the messages themselves, may be of a compatibility of any communication protocol. Further, it is to be understood that the messages are not to be limited to the information and data fields used in the above examples.

Referring now to FIG. 3, an apparatus for conducting the pre-conference negotiation phase is shown. In this figure each of the messages used in the pre-conference negotiation phase can be sent over an Internet line 500. For example, Host 100 and each of the respective potential conference Participants 300 communicate with the WSCP 200, using an Internet protocol, over each of their respective Internet communication lines 500. Further, the WSCP 200 also communicates, using the same Internet protocol, with the service provider SCP 400 over Internet communication line 500. The SCP 400, on the other hand, can also communicate over a PSTN communication line 600 with a Signal Transfer Point (STP) 700. The STP 700 likewise communicates with various Switch Offices 800 over like PSTN communication lines 600. Thus, assuming the conference is to be conducted telephonically, at the established date and time for the conference, the SCP 400 can establish a voice bridge (not shown) between the Host 100 and Participants 300 through other PSTN communication lines (also not shown). Alternatively, assuming the conference is to be conducted as a video conference, the SCP 400 can establish a video link (not shown) between the Host 100 and Participants 300 over video communication lines (also not shown).

As can be applied to the above descriptions, it is to be understood that the WSCP is not limited to handling only one pre-conference negotiation at a time, and in fact alternatively, it is envisioned that the WSCP will handle a multitude of different pre-conference negotiations at once. Further, while such pre-conference negotiations are conducted over the Internet according to an embodiment of the present invention, it is to be understood that this is not to be limiting to the means of communication by which the conference itself is conducted, nor is it to be limiting on means by which the host initially contacts the WSCP and by which the WSCP contacts the communication service provider.

Thus as can be seen from the above, the present invention provides a conference call mediation service and is able to act as a "smart secretary" by carrying out the functions of pre-conference negotiation and scheduling. This thus provides better information to potential conference participants and helps the conference host to ensure better conference attendance.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A method for scheduling over the Internet a conference, the method comprising the steps of:

sending a request for more information to a conference requesting party if a conference request is not complete;

sending a conference invitation based on the conference request, the conference invitation having at least one attribute pertaining to a substantive aspect of a desired conference, to at least one potential conference participant;

collecting at least one conference response from the at least one potential conference participant;

identifying whether the at least one conference response modifies the at least one attribute;

sending a notice of conference modification, if the at least one attribute has been modified, to the at least one potential conference participant; and coordinating resource allocation, if the at least one attribute has not been modified, with a communication service provider.

2. The method according to claim 1, further comprising the step of:

implementing an instruction, if the conference response is an updated conference response that further modifies the at least one attribute, regarding a condition of non-agreement of the scheduling of the conference.

3. The method according to claim 1, further comprising the step of:

assigning a unique session-ID to the at least one attribute, wherein the unique session-ID is used in at least one communication to identify the at least one attribute of the desired conference.

4. The method according to claim 1, wherein the at least one attribute is contained in at least one data field.

5. The method according to claim 1, wherein the at least one attribute is at least one of:

at least one conference agenda item, and at least one relevant document for the desired conference.

6. The method according to claim 1, wherein the at least one potential conference participant is a PSTN subscriber.

7. A method for scheduling over the Internet a conference, the method comprising the steps of:

receiving a conference request, containing at least one attribute pertaining to a desired conference, from a conference requesting party;

checking whether the conference request is complete;

sending a request for more information, if the conference request is not complete, to the conference requesting party;

sending an acknowledgement, if the conference request is complete, to the conference requesting party;

sending a conference invitation, having the attribute, to at least one potential conference participant;

collecting at least one conference response from the at least one potential conference participant;

identifying whether the at least one conference response modifies the at least one attribute;

sending a notice of conference modification, if the at least one attribute has been modified, to the at least one potential conference participant; and coordinating resource allocation, if the at least one attribute has not been modified, with a communication service provider.

8. The method according to claim 7, further comprising the step of:

adding any missing information to the conference request.

9. The method according to claim 7, wherein if a response to the request for more information is not received after a pre-determined time period has elapsed, the step of sending the request for more information will be repeated.

10. A method for scheduling over the Internet a conference, the method comprising the steps of:

sending a conference invitation, having at least one attribute pertaining to a desired conference, to at least one potential conference participant;

collecting at least one conference response from the at least one potential conference participant;

identifying whether the at least one conference response modifies the at least one attribute;

sending a notice of conference modification, if the at least one attribute has been modified, to the at least one potential conference participant;

coordinating resource allocation, if the at least one attribute has not been modified, with a communication service provider;

determining whether the desired conference can be scheduled;

returning to the step of coordinating resource allocation if the desired conference cannot be scheduled; and sending a notice of commitment, if the conference can be scheduled, to the at least one potential conference participant.

* * * * *